April 27, 1926.
G. B. RUNYAN
MEAT CUTTER
Filed Jan. 13, 1925      2 Sheets-Sheet 1
1,582,483
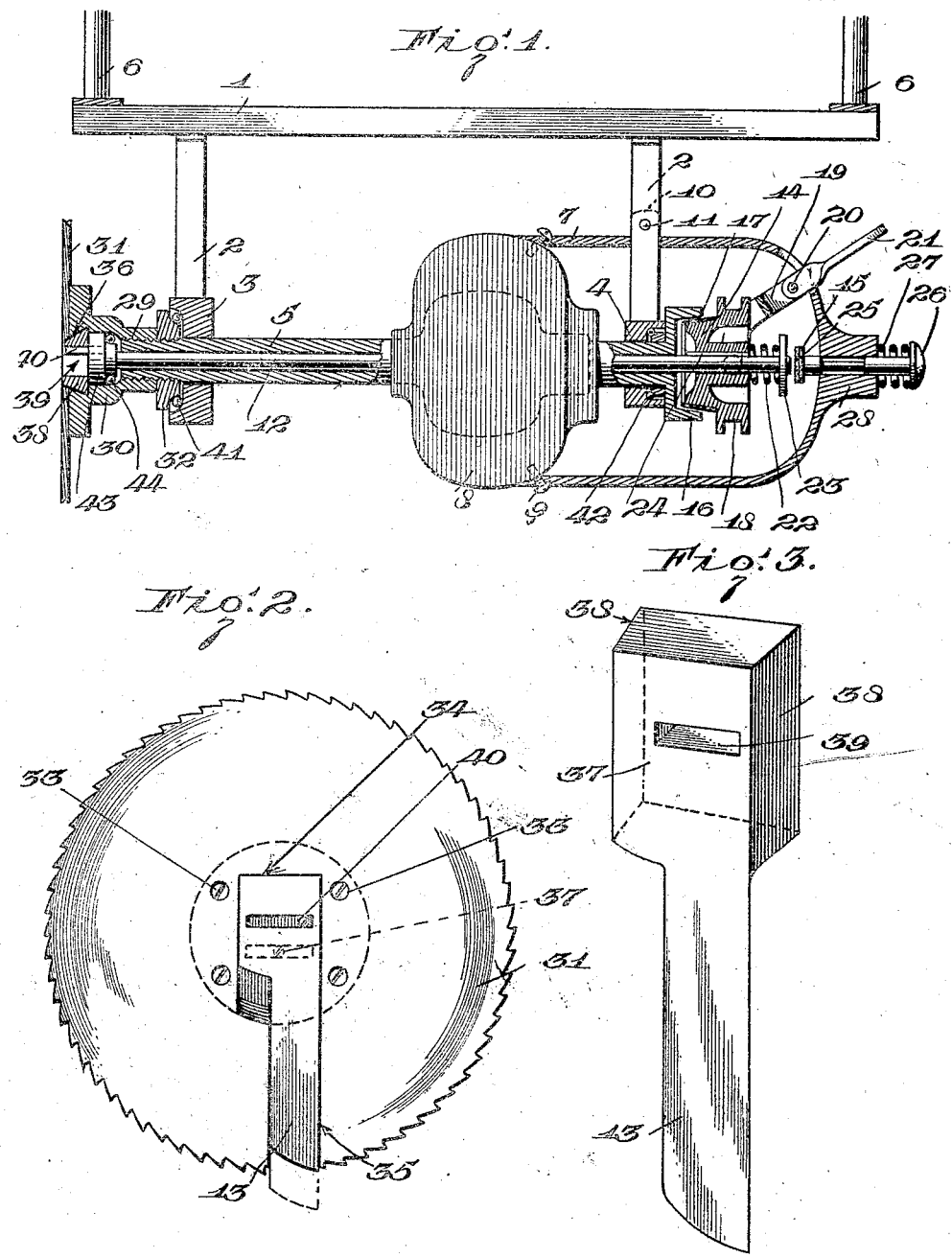

April 27, 1926.

G. B. RUNYAN

MEAT CUTTER

Filed Jan. 13, 1925    2 Sheets-Sheet 2

WITNESSES

INVENTOR
Geniah B. Runyan
BY
ATTORNEYS

Patented Apr. 27, 1926.

1,582,483

UNITED STATES PATENT OFFICE.

GENIAH B. RUNYAN, OF KUSA, OKLAHOMA.

MEAT CUTTER.

Application filed January 13, 1925. Serial No. 2,190.

*To all whom it may concern:*

Be it known that I, GENIAH B. RUNYAN, a citizen of the United States, and resident of Kusa, in the county of Okmulgee and State of Oklahoma, have invented certain new and useful Improvements in Meat Cutters, of which the following is a specification.

This invention relates to improvements in meat cutters, and it consists of the constructions, combinations and arrangements herein described and claimed.

An object of the invention is to provide a motor driven implement for butchers' use, providing both for the cutting of the meat and the sawing through of bones.

Another object of the invention is to provide an implement of the character described wherein the circular saw and cutting blade are combined in one, the cutting blade being projectible for cutting action by a novel manipulation of certain controls in the implement.

Another object of the invention is to provide an implement of the character described wherein the cutting blade or knife is practically contained by the saw and is projectible beyond the periphery of the saw for a cutting action.

Other objects and advantages will appear in the following specification, reference being had to the accompanying drawings, in which—

Figure 1 is a sectional view, parts being in elevation, illustrating the general arrangement of the improved meat cutter.

Figure 2 is a front elevation of the circular saw showing how the cutting blade or knife is housed or contained thereby.

Figure 3 is a detail front elevation of the saw hub and knife.

Figure 4:
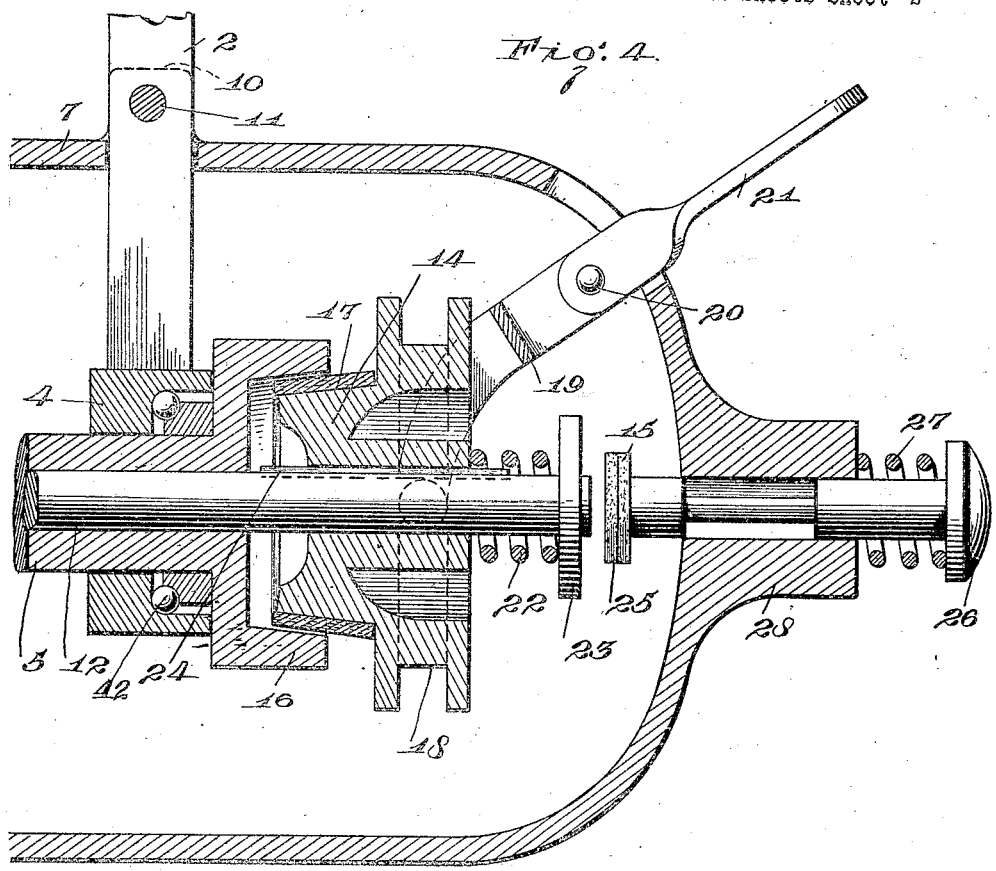
Figure 4 is a detail sectional view of the clutch arrangement.

This invention is an improvement on the cutter disclosed in the United States Patent #1,483,617 granted to me on February 12, 1924. That patent discloses both a circular saw and a circular knife. It has been found in practice that the action of the cutting knife has a tendency to roll over the meat and also to pull it. The improvement herein disclosed avoids the present difficulty and introduces other novel arrangements.

In carrying out the invention, provision is made of a frame 1 (Fig. 1) for the purpose of supporting the mechanism by means of suitable hangers 2 which are attached in any conventional manner to bearings 3 and 4 of the motor shaft 5. The supporting frame has rods or columns 6 which, according to the patent, referred to, extend upward and have telescopic engagement (not shown) with other supporting structure.

A casing 7 covers the clutch mechanism and provides means for holding the electric motor 8 in rigid position. In carrying out this purpose use is made of screws 9 which pass through a part of the casing into the motor shell. The casing, in turn, has lugs 10 which are suitably secured at 11 to one of the hangers 2. The arrangement just described is in practice subject to variation, because it is conceivable that other and perhaps better means of holding the motor may be adopted.

Figure 5:
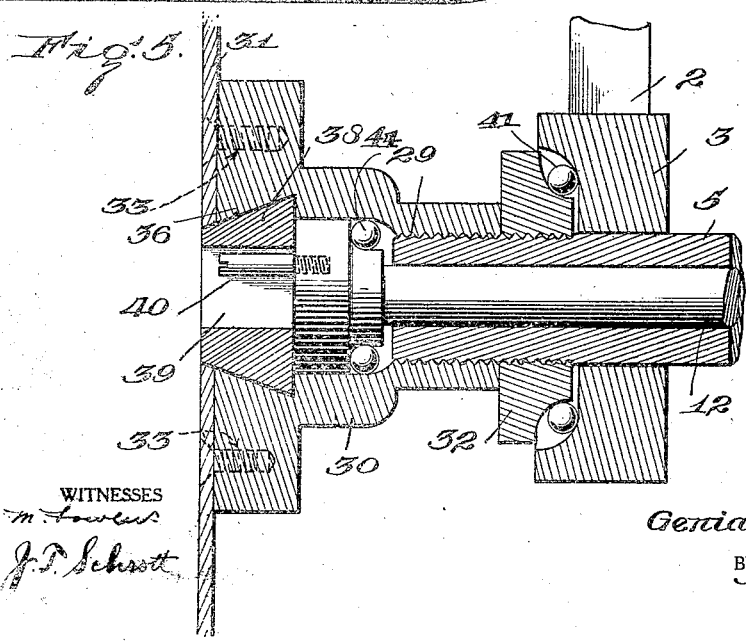
Figure 5 is a detail sectional view of the saw hub and bearings.

The motor shaft 5 is hollow and carries the knife shaft 12, so-called because of the fact that the knife 13 is attached thereto, said knife shaft being subject to independent movement by reason of the functions of either the clutch 14 or brake 15. The right end of the motor shaft 5 stops short of the end of the knife shaft (Figs. 1 and 5) and there carries the hub 16 with which the lining 17 of the clutch is adapted to internally engage.

The clutch includes a grooved collar 18 with which the clutch lever 19 engages in such a way as to move the clutch back and forth. The clutch lever is pivoted at 20 upon the casing 7, and has a handle 21 for operation.

A spring 22, seated between the clutch 14 and a washer 23 upon the knife shaft, tends to normally press the clutch into engagement with the hub 16. The clutch turns with the knife shaft by means of the key 24, but the key is straight in order to permit the necessary sliding of the clutch. Upon permitting the clutch 14 to move into engagement with the hub 16 by releasing the handle 21, the knife shaft 12 is made to revolve at the same rate as the motor shaft 5. The brake 15 has a facing 25 of leather, or the like, for the purpose of frictionally engaging the adjacent end of the knife shaft 12. The brake has a button 26 which is depressed against the tension of the spring 27. The button is operable in a boss 28 of the casing 7, and the purpose of the brake is to slow or stop the motion of the knife shaft 12.

A threaded portion 29 of the motor shaft 5 carries the hub 30 of the saw 31 as well as the adjustable cone 32 of the adjacent ball bearing. The hub 30 acts as a lock nut for the bearing cone. A number of screws 33 (usually 4) secure the circular saw to the hub. The saw has a central rectangular opening 34 with which a radial slot 35 communicates. The rectangular opening communicates with a recess 36 in the hub 30. The head 37 of the knife 13 is dove-tailed at 38, and the sides of the recess 36 are shaped to correspond. This arrangement permits radial sliding movement of the blade. The knife occupies the radial slot 35, and under normal circumstances is so retracted within the saw 31 that the extreme edge comes substantially flush with the periphery of the saw as shown in full lines in Figure 2.

A transverse slot 39 in the head 37 of the knife makes room for a pin 40 on the end of the knife shaft 12. The pin 40 performs the function of a crank. Upon appropriate turning of the knife shaft 12 the knife 13 will be extended to the dotted line position in Figure 2, and again upon further appropriate motion will cause the retraction of the knife within the saw. The bearings 3 and 4, previously mentioned, have ball races 41 and 42 against which adjacent cones run. The head 43 of the shaft 12 that carries the head 40 is shaped into a bearing cone to run against the balls 44 situated between the head and the hub 40. There are times when relative movement of the shafts 5 and 12 occur, and the ball bearing 44 functions at such times.

The operation is now readily understood. The electric motor 8 is controlled by a switch (not shown) according to common practice. The circular saw 31 commences to revolve immediately upon the starting of the motor because the saw is carried by the motor shaft 5. The knife 13 also revolves with the saw, and at the same speed, because it must necessarily do so being situated in the slot 35 (Fig. 2) of the saw. The clutch 14 is normally in place in the hub 16, being pressed there by the spring 22. The brake 15 is normally disengaged by the spring 27.

It is assumed that the saw 31 is first used for cutting through bones. The knife 13 must then be retracted within the slot 35 so that the point of the knife does not project beyond the periphery of the saw. It would not do to have the point of the knife strike the bone. The knife 13 remains retracted as long as the clutch 14 is kept in engagement with the hub 16. This engagement practically locks the two shafts 5 and 12 together so that there can be no relative turning between the two. Upon desiring to cut through meat the operator extends the knife 13. The extension occurs at the point of the knife as shown by dotted lines in Figure 2. The amount of extension is not very great, but it is sufficient to perform the desired cutting. The so-called cutting is actually a chopping, but the shafts revolve with such rapidity that the chopping action is resolved into a continuous cutting action.

The knife is extended, as stated, by pressing upward on the handle 21 of the clutch lever 19. This act disengages the clutch 14 from the hub 16. The inner knife shaft 12 is now freed of all restriction. The centrifugal action upon the knife 13 always tends to carry the knife out of the slot 35. This tendency is checked while the clutch is in engagement, but when the clutch is released, as stated, the centrifugal action immediately asserts itself by carrying the knife 13 out to the limit. This action is accompanied by a turning of the crank pin 40 in the slot 39, and the limit of motion of the knife is reached when the crank pin reaches its outer center as shown by dotted lines in Figure 2. The clutch 14 is now permitted to move back into engagement with the hub 16, locking the two shafts together, and the meat-cutting action is then proceeded with.

Assume next that the operator desires to retract the knife 13 while the saw is yet in operation. He presses the palm of his hand against the button 26, and with the same hand presses upward on the clutch handle 21. This has the combined effect of moving the brake 15 toward the end of the shaft 12, and of disengaging the clutch from the hub 16. The shaft 12 is thus freed, but the engagement of the brake slows the rate of turning of the shaft. This slowing of the shaft causes a gradual relative movement of the crank pin 40 in respect to the hub 30 of the saw so that the knife 13 is gradually retracted within the slot 35 to its former position (full lines in Figure 2).

This action is best understood by considering the application of the brake 15 as causing a reduction in the rate of rotation of the shaft 12.

The motor shaft 5 may, for example, be assumed to rotate at the rate of 100 R. P. M. The application of the brake 15 will cause the shaft 12 to lag behind the shaft 5 in rotation so that instead of the two moving in synchronism the shaft 12 will make, say 70 R. P. M. or perhaps it may be totally stopped. The reader will see that the relative motion of the two shafts must result in a change of position of the crank pin 40, and this change of position of the crank pin is accompanied by a change of position of the knife. As soon as the knife is found to have been fully retracted, the clutch handle 21 is released, permitting the clutch 14 to reengage the hub 16 so that a positive drive of the shaft 12 is established.

It is to be observed that the knife blade 13 is flush with the surfaces of the saw at both sides, thereby offering no obstruction to either a bone or a meat cutting operation. The knife 13 is capable of being taken out by removing the saw 31 from the hub plate. The crank pin 40 is also removed, but in practice this pin is made with a screw end so that it can readily be unscrewed. In practice it may be desired to use both larger saw and knife blades, but inasmuch as this is largely a matter of judgment, particular details need not be given.

While the construction and arrangement of the improved meat cutter is that of a generally preferred form, obviously, modifications and adaptations may be made without departing from the spirit of the invention or the scope of the claims.

I claim:—

1. A device of the character described comprising a circular saw having a slot, a knife for cutting meat occupying said slot, and means in positive connection with the knife and operable with a crank motion for projecting said knife until the end extends beyond the periphery of the saw to permit the cutting of meat.

2. A device of the character described comprising a circular saw having a radial slot, a knife occupying said slot and being slidable therein, means including a shaft for projecting the knife, and a positive operating connection between the shaft and knife withstanding the tendency of the knife to project from the slot by centrifugal action when the saw is in rotation.

3. A device of the character described comprising a circular saw, a shaft for driving the saw, a knife carried by the saw being extensible by centrifugal action beyond the periphery of the saw into a position to cut meat, and means having a crank pin occupying the slot in said head for the purpose of holding the knife in desired adjusted relation to the saw.

4. A device of the character described comprising a circular saw having a radial slot, a knife occupying the slot and being extensible beyond the periphery of the saw by centrifugal action, a pair of shafts respectively for the saw and knife, means for driving one of the shafts, a crank pin connection between the other shaft and the knife, means including a clutch arrangement for locking the shafts together and holding the knife in an extended position, means for shifting the clutch including a handle permitting freeing the knife shaft, and a brake for slowing the motion of the knife shaft causing such relative turning as will move the knife in relation to the saw by means of the action of the crank pin, said brake including a push button and a pad to engage the ends of the knife shaft, means in engagement with the knife, and means so holding said engaging means as to withstand the centrifugal action and hold the knife retracted within the periphery of the saw.

5. A device of the character described comprising a circular saw, a shaft for driving the saw, a knife for cutting meat carried by the saw, a shaft having a pin in such engagement with the knife as to keep it retracted within the periphery of the saw against the tendency toward projection by centrifugal action, and means including a clutch arrangement for locking the shafts together thereby to maintain the knife in the retracted and inoperative position.

6. A device of the character described comprising a circular saw, a shaft for driving the saw, a knife for cutting meat carried by the saw, a shaft having a pin in such engagement with the knife as to keep it retracted within the periphery of the saw against the tendency toward projection by centrifugal action, means including a clutch arrangement for locking the shafts together thereby to maintain the knife in the retracted and inoperative position, and means to shift the clutch thereby to release the knife shaft and permitting projection of the knife beyond the periphery of the saw by a resulting relative turning of the knife shaft.

7. A device of the character described comprising a circular saw, a hollow shaft for driving the saw, a knife carried by the saw and having an opening in a portion thereof, a central shaft having means including a pin extending through an opening, and locking means including a clutch for causing the shafts to turn together and holding the knife in position in respect to the saw according to a particular location of said pin.

8. A device of the character described comprising a circular saw, a shaft for driving the saw, a knife slidably carried by the saw and having an opening in a portion thereof, a shaft having a crank pin occupying said opening, means including a clutch for locking the shafts together thereby causing the pin to hold the knife in position in respect to the saw, and means including a clutch lever for shifting the clutch and releasing the knife shaft permitting extension of the knife beyond the periphery of the saw by centrifugal action until there has occurred such relative turning of the knife shaft as to cause the crank pin to limit the sliding of the knife.

9. A device of the character described comprising a circular saw, a shaft for driving the saw, a knife slidably carried by the saw being extensible beyond the periphery by centrifugal action, a portion of said knife having an opening, a shaft having a crank pin occupying said opening, means including a clutch locking the shafts together, means including a clutch handle for shifting the clutch to release the knife shaft, and a brake to then engage a portion of the knife shaft causing a slowing of movement and such turning of the crank pin in relation to the saw as will retract the knife toward the periphery of the saw.

10. A device of the character described comprising a circular saw having a radial opening, a revoluble hub carrying the saw and having a recess communicating with a portion of said opening, a shaft extending into the hub and having a crank pin, a knife slidable in the saw opening, and a head forming part of the knife occupying a portion of the opening and said recess, said head having a transverse slot receiving the crank pin.

GENIAH B. RUNYAN.